United States Patent [19]

Lomer

[11] 4,168,011
[45] Sep. 18, 1979

[54] FUEL FILLER CAP WITH A DETACHABLE HANDLE

[75] Inventor: Rowland S. Lomer, Lathrup Village, Mich.

[73] Assignee: General Motors Corporation, Detroit, Mich.

[21] Appl. No.: 956,889

[22] Filed: Nov. 2, 1978

[51] Int. Cl.² ............................................. B65D 25/28
[52] U.S. Cl. .................................. 220/94 R; 220/303
[58] Field of Search .................... 220/94 R, 281, 293, 220/295, 303, 304, DIG. 32, DIG. 33

[56] References Cited

U.S. PATENT DOCUMENTS

| | | | |
|---|---|---|---|
| 1,896,309 | 2/1933 | Henst | 220/295 |
| 4,081,102 | 3/1978 | Sakai | 220/303 |

Primary Examiner—George T. Hall
Attorney, Agent, or Firm—Donald F. Scherer

[57] ABSTRACT

A fuel filler tube closure cap for a motor vehicle fuel tank includes a handle portion which is detachable from the closure portion. The handle has a skirt which covers the fill tube opening in a vehicle body panel such that on relative movement of the fill tube away from the body panel, a force is applied to the skirt causing separation of the handle portion and the closure portion. The closure portion remains with the fill tube to maintain fuel system integrity.

2 Claims, 3 Drawing Figures

FUEL FILLER CAP WITH A DETACHABLE HANDLE

This invention relates to closure caps and more particularly to fuel tank closure caps having a detachable handle.

It is an object of this invention to provide an improved fill tube closure cap having a handle portion which is detachable from the closure portion.

It is another object of this invention to provide an improved fill tube closure cap having a handle drivingly connected to a closure portion to permit rotation of the closure portion upon application of torque to the handle and the handle being detachable from the closure portion upon subjecting the handle to a linear force having a component parallel to the rotational axis of the closure portion.

These and other objects and advantages of the present invention will be more apparent from the following description and drawings in which.

Figure 1:
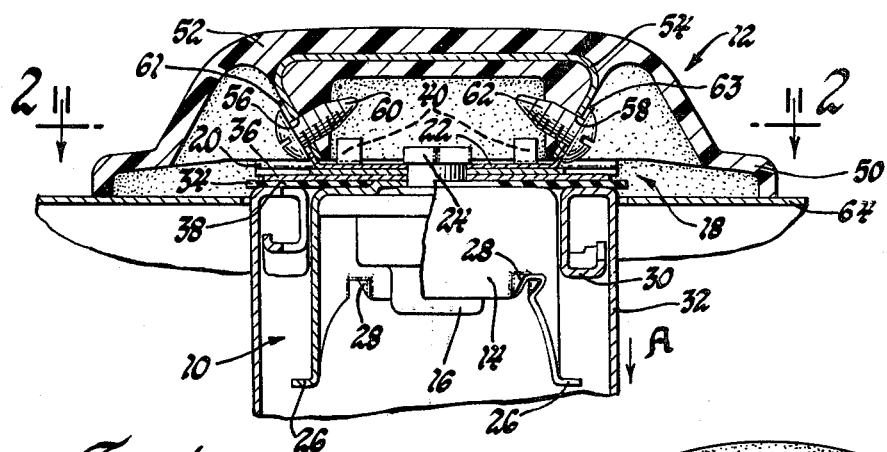
FIG. 1 is a sectional elevational view of a closure cap incorporating the present invention.
Figure 2:
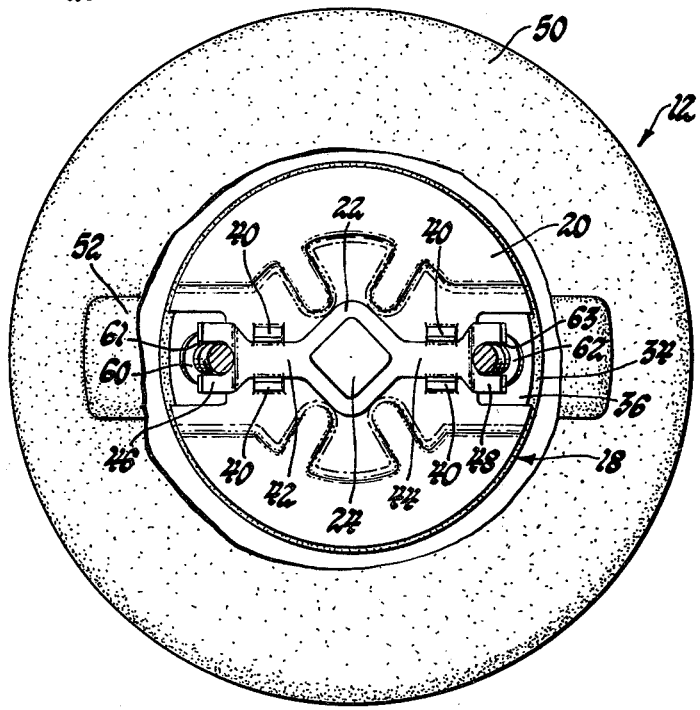
FIG. 2 is a view taken along line 2—2 of FIG. 1.
Figure 3:
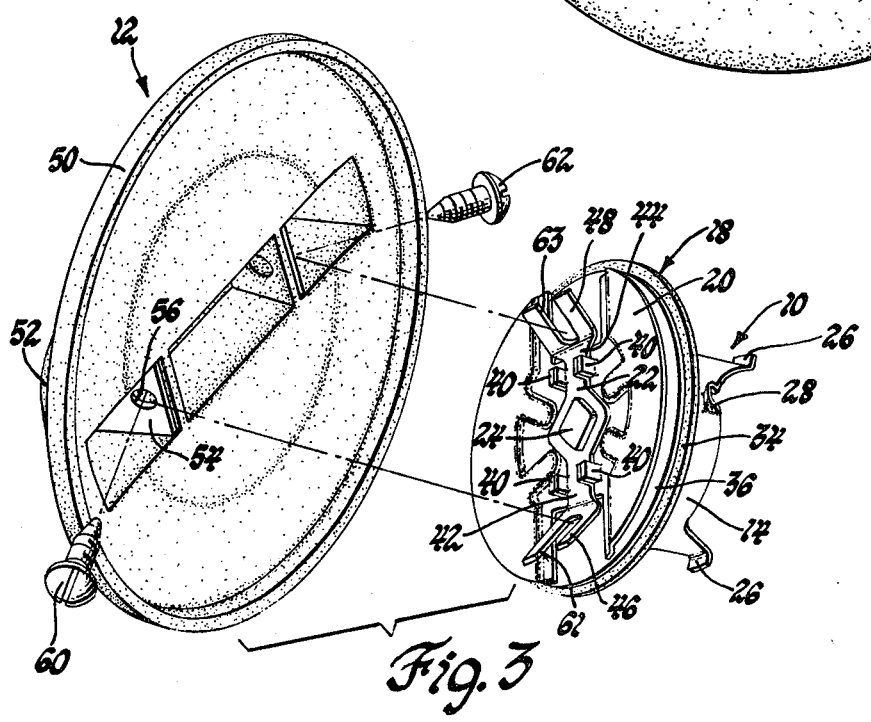
FIG. 3 is an exploded perspective view showing the handle separated from the closure portion.

Referring to the drawings, there is seen a fuel fill tube cap having a closure portion generally designated 10 and a cover plate or handle portion generally designated 12. The closure portion 10 includes a cup-shaped member 14, a valve assembly 16, a seal assembly 18, a plate member 20 and a resilient member 22. The components of the closure portion 10 are secured together by a rivet 24. The cup-shaped member 14 has two pairs of locking tabs 26 and 28 which are adapted to engage an inner flange 30 of a fill tube 32 in the manner described in U.S. Pat. No. 3,703,245 to Brewer issued Nov. 21, 1972. The valve assembly 16 is conventional in construction and permits venting of the fuel tank, not shown, in a well-known manner.

The seal assembly 18 includes a flexible diaphragm 34 and a backing spring 36 disposed intermediate the diaphragm 34 and the plate member 20 such that upon full engagement of the locking tabs 28 with the fill tube 32, the diaphragm 34 will seal against an annular surface 38 formed on the end fill tube 32.

The plate 20 has four upstanding tangs 40 which are disposed in pairs adjacent oppositely extending arms 42 and 44 of resilient member 22. The plate member 20 has sufficient stiffness to cause the spring 36 to force the diaphragm 34 into sealing engagement with the annular surface 38.

The resilient member 22 has a bifuracted end 46 which extends obliquely from arm 42 and a bifurcated end 48 which extends obliquely from arm 44.

The handle 12 has a skirt portion 50 which is generally circular and a manual gripping or central raised portion 52 generally rectangular in cross section. The center of the raised portion 52 is disposed in a plane which passes through the center of skirt 50. The skirt 50 and raised portion 52 are preferably constructed of flexible material such as plastic. A steel drive plate 54 is embedded in the portion 52 and has formed therein a pair of apertures 56 and 58 adapted to receive threaded fasteners 60 and 62, respectively. The fasteners 60 and 62 also pass through the slots 61 and 63, respectively, which are formed in the bifurcated ends 46 and 48, respectively, of arms 42 and 44. The fasteners 60 and 62 maintain the resilient member 22 in a torque transmitting relation with the handle 12 such that upon rotation of the handle 12 about the longitudinal axis of the closure portion 10 the cap may be manually engaged with or removed from the fill tube 32.

The end of fill tube 32 adjacent the annular surface 38 is surrounded by a vehicle body panel 64, such as a fender or quarter panel. The handle 12 is preferably manufactured to have the same color as the outer surface of the body panel 64 providing aesthetic value.

In the event that the fill tube 32 should be moved in the direction of Arrow A, upon an external force being applied thereto, or an external force is applied to the body member 64 in a direction opposite to Arrow A, the skirt 50 will contact the body panel 64 such that a linear force will be applied to the handle 12. This linear force will, of course, have a component which is parallel to the longitudinal axis of the closure portion 10. This force will be transmitted to one or both fasteners 60 or 62 and if the force is sufficient, will cause separation between the handle 12 and the resilient member 22. The resiliency of member 22 permits this portion to deflect sufficiently to accommodate this separation. Upon separation of the handle 12 from portion 10, the closure portion 10 will remain intact with the fill tube 32 thereby maintaining the seal integrity provided by seal assembly 18. The closure portion 10 can be removed from the fill tube 32 if necessary after the handle portion has been detached by placing an appropriately sized rod (not shown) in engagement with and between the bifurcated ends 46 and 48 and rotating the rod and therefore closure 10 in the proper direction.

While the handle 12 has been described as a resilient component such as plastic, it does have sufficient stiffness to transmit the force applied thereto to the fasteners 60 and 62 to permit the detachment as described above.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fuel cap for closing the fill tube of a fuel tank for a vehicle wherein the fill tube is disposed within a vehicle body panel, said fuel cap comprising; a closure portion having lock means for securing said cap to a fill tube and seal means for sealing the fill tube when the closure portion is secured to the fill tube; a cover plate having a handle portion and a skirt adapted to be flush with a vehicle body panel surrounding the fill tube, and resilient drive means interconnecting said cover plate and said closure portion to permit manual rotation of said closure portion to engage and disengage said fuel cap with the fill tube, said drive means being flexible to the axial direction to be disengageable when subjected to a predetermined axial force between the cover plate and the closure portion upon relative movement between said fill tube and its surrounding vehicle body panel to maintain said closure portion secured to said fill tube.

2. A fuel cap for closing the fill tube of a fuel tank for a vehicle wherein the fill tube is disposed within a vehicle body panel, said fuel cap comprising; a closure portion having lock means for securing said cap to a fill tube and seal means for sealing the fill tube when the closure portion is secured to the fill tube; a cover plate having a manual gripping portion and a skirt adapted to be flush with a vehicle body panel surrounding the fill tube, and drive means interconnecting said cover plate and said closure portion to permit manual rotation of said closure portion to engage and disengage said fuel cap with the fill tube, said drive means including a resilient member secured to said closure portion, a drive member secured to said cover plate and fastening means drivingly connecting said resilient member and said drive member for unitary rotary motion, said fastening means being disengageable when subjected to a predetermined axial force between the cover plate and the closure portion upon relative movement between said fill tube and its surrounding vehicle body panel to maintain said closure portion secured to said fill tube.

* * * * *